United States Patent [19]

Horner, Jr. et al.

[11] Patent Number: 4,558,558
[45] Date of Patent: Dec. 17, 1985

[54] LAWN MOWER TRACTION CONTROL SYSTEM

[75] Inventors: Herbert F. Horner, Jr., Tonka Bay; Michael M. Zenner; Daniel P. Nowack, both of Minneapolis; Herman P. Christopherson, Burnsville, all of Minn.

[73] Assignee: The Toro Company, Minneapolis, Minn.

[21] Appl. No.: 636,428

[22] Filed: Jul. 31, 1984

[51] Int. Cl.⁴ .............................. A01D 69/10
[52] U.S. Cl. ......................... 56/11.3; 56/11.6; 192/11; 180/19.3
[58] Field of Search ............... 56/11.3, 11.6; 192/11, 192/12 R, 17 R; 180/19.1

[56] References Cited

U.S. PATENT DOCUMENTS

| 1,450,019 | 3/1923 | Canning | 192/11 |
| 2,718,154 | 9/1955 | Mathson | 192/11 |
| 4,213,288 | 7/1980 | Plamper et al. | 180/19.1 |

FOREIGN PATENT DOCUMENTS

2116663 9/1983 United Kingdom ............... 192/11

Primary Examiner—Gene Mancene
Assistant Examiner—David I. Tarnoff
Attorney, Agent, or Firm—Joseph P. Martin

[57] ABSTRACT

A self-propelled lawn mower (2) has an engine (4), transmission (8), two drive wheels (10) and a rearwardly and upwardly extending handle (18). A pivotable and rotatable control bar (20) is mounted on handle (18). The pivotable and rotatable bar (20) provides individual or simultaneous engagement of drive wheels for ground traction, gradual or zero radius turns, and braking. Thus a single control bar (20) provides a multitude of functions.

6 Claims, 8 Drawing Figures

FIG. 7

LAWN MOWER TRACTION CONTROL SYSTEM

TECHNICAL FIELD

This invention relates to a combined traction and steering control on a self-propelled ground working machine such as a lawn mower. More specifically, it relates to a single control bar which engages and disengages the ground drive, steers and brakes the machine.

BACKGROUND OF THE INVENTION

Small walk behind mowers and large riding mowers have long been known to the industry. Mid-size riding mowers have also been introduced for high speed mowing on relatively unobstructed lawns. A need has been recognized also for a mid-size walk behind mower. "Mid-size" is generally recognized to encompass mowers in the range of approximately 36-60 inches. Even though these mowers cut a swath the same width as a comparable riding mower, they are slower, and thus more maneuverable. The walk behind mowers are usually utilized on large lawns with numerous trees, shrubs, flowerbeds and the like which necessitate intricate trimming and interfere with the high speed operation of the riding mowers. Walk behind mowers are also often used in areas with steep slopes, which may pose traction of tipping problems to riding mowers. Walk behind mowers are also generally considerably less expensive than riding mowers.

The typical prior art mower of this type has two handles equipped with squeeze-type levers controlling two driving wheels mounted at the rear corners of the cutting unit. When the mower is shifted into a driving gear, it will proceed in the selected direction. To make a turn, one of these squeeze-type levers must be pressed to either engage a brake or to overcome a spring loaded idler, thus removing tension from a drive belt and disengaging the drive to that wheel. The other wheel continues to drive, thus effecting the turn. This type of control could be characterized as "normally engaged", since it is engaged unless shifted out of gear, or both levers pressed simultaneously. If the operator slips and falls, or otherwise unintentionally leaves the operator's position, the unit will proceed in the selected direction until it is stopped by an obstruction or other means.

Because a tension spring biasing an idler pulley against a drive belt is normally quite strong to prevent belt slippage, it takes considerable force to squeeze the levers to disengage the drive. Engaging a brake with a hand lever can also require a considerable amount of effort. When cutting a lawn with many trees, shrubs, and the like which necessitates a great amount of turning, the operator's hands, wrists and arms are subject to significant fatigue. There are various other disadvantages to machines of this general type. For example, it is necessary on many models to lock out both hand levers with thumb screws or other means in a specific position to place the drive in neutral in order to start the engine. Then the levers must be unlocked before the machine can be put in motion.

The present invention overcomes the problems and disadvantages of the prior art, and discloses a novel control system that provides simplified means for controlling the functions of a walk behind mower or the like.

SUMMARY OF THE INVENTION

Since it is obviously less convenient for an operator to walk behind a mower than to ride on a mower, it is a primary objective of the present invention to make it as effortless as possible to operate a walk behind mower.

In the preferred embodiment of the present invention, a single control bar is provided to control the ground drive, steering, and braking. The bar is somewhat similar to the handlebar on a bicycle, except that it can be moved forward and rearward in a limited arc as well as pivoting on a central mounting point. An engine mounted on the frame delivers power to a transmission mounted behind the engine. Drive shafts transverse to the direction of travel extend from both sides of the transmission. A pulley is mounted at the outer end of each drive shaft. A double width belt delivers driving power from the pulleys to drive wheels in a loose/tight belt drive arrangement. Linkages extended from each end of the control bar forwardly and downwardly to a pivotable bracket at each side of the frame. A large idler pulley is mounted to each bracket. A second linkage extends from each bracket to a brake attached to each drive wheel. As the control bar is pushed forward evenly, both idler pulleys apply tension to their respective drive belts, and both wheels drive and the mower proceeds straight in the gear ratio selected. Torsion springs attached between the brackets and frame return the brackets to their original position, thereby lifting the idler pulleys from the belts, thus disengaging the drive and returning the control bar to its original position. To engage the brakes, the bar is pulled evenly to the rear. To make a turn, one end of the control bar is pressed forward thereby engaging only the associated wheel. The other wheel remains disengaged and the driving wheel effects a power turn in the opposite direction, i.e. if the left wheel is engaged and the right wheel disengaged, the macine will turn to the right. Thus, the control is similar to steering a bicycle or a car, and is quite a natural movement. To make a very sharp turn, one end of the bar is pushed forward to engage the associated wheel, and the other end of the bar is pulled back to engage the brake on the other wheel. The mower will pivot on the braked wheel in a zero radius turn. When the control bar is released, torsion springs return it to its original position with the drive disengaged. A pivoting parking brake lever is attached to the mount for the control bar, and may be wedged between the control bar and the stationary upper hand rest to hold the brakes in the engaged position. A significant advantage of the present invention is that the mower can be controlled with one hand if necessary. For example, when mowing under trees with low hanging branches, one hand can control the mower while the other hand can hold the branches out of the way.

BRIEF DESCRIPTION OF THE DRAWINGS

This invention will be described more fully in the following Detailed Description, in view of the following drawings, in which like numerals refer to like elements throughout.

DETAILED DESCRIPTION

Figure 1:
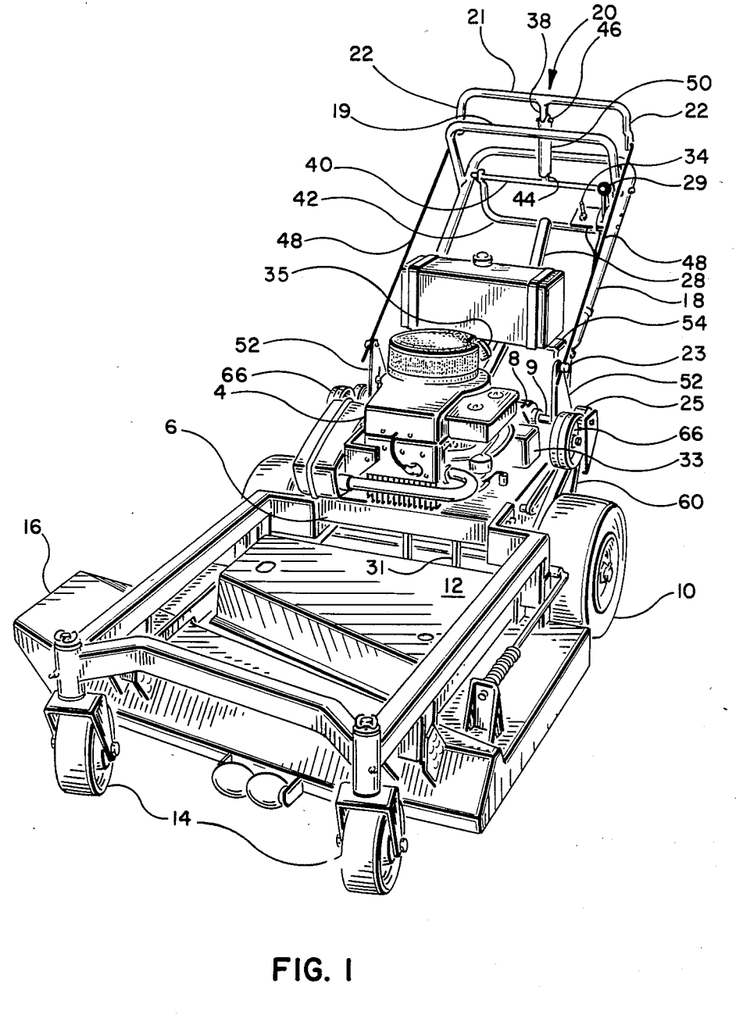
FIG. 1 is a perspective view of a mower according to this invention, particularly illustrating a single control bar.

Referring first to FIG. 1, a mower according to the present invention is generally designated as 2. Mower 2 is of the mid-size commercial type, having an engine 4, frame 6, transmission 8, drive wheels 10, housing 12 including a cutting element (not shown), wheels 14 for supporting the housing 12, a discharge port 16 on the housing 12, and a rearwardly and upwardly extending handle 18 to which the control bar 20 of the present invention is attached. Handle 18 is preferably U-shaped, with the open end attached to frame 6 and the transverse end of the "U" to the rear. Handle 18 includes hand rest 19 mounted perpendicular to handle 18 and transverse to the direction of travel.

Power for ground traction is transmitted from engine 4 to transmission 8, perferably by a belt (not shown), and thence to drive pulley 25 by means of shafts 27. Shift lever 28 enables shifting into a desired gear ratio. Throttle lever 29 controls engine speed.

Driving power is transmitted by a second belt 31 to the cutting elements (not shown) under housing 12 by means of an electromagnetic clutch 33. A switch 34 engages or disengages the clutch.

Engine 4 may be equipped with a conventional recoil starter having a starter rope with a pull grip 36 at its outer end, or the engine may be equipped with an automotive-type electric starter.

The operator's station is directly behind handle 18 where he has access to all of the controls. For large area mowing, a sulky may be attached to the frame so the operator may ride.

Figure 2:
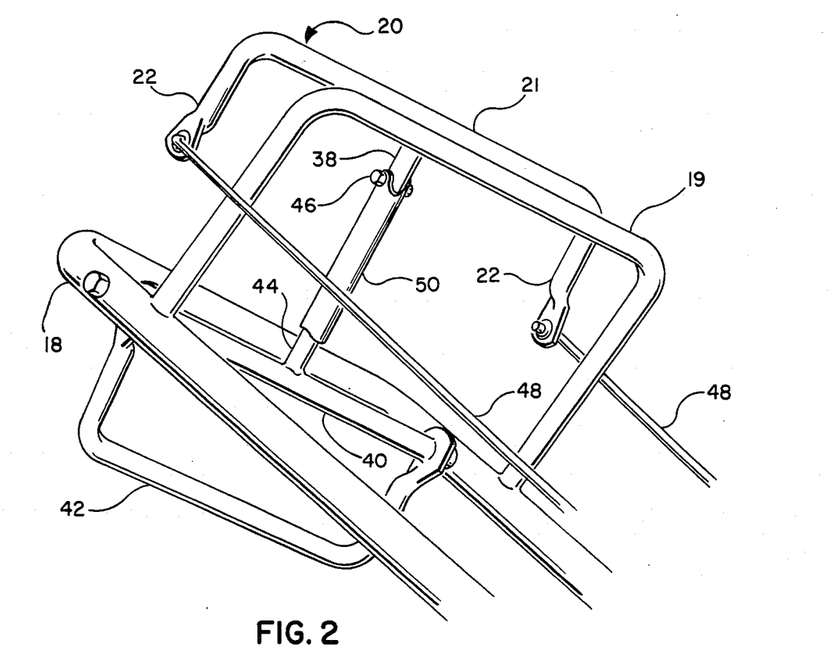
FIG. 2 is a perspective view of the control bar of FIG. 1.
Figure 3:
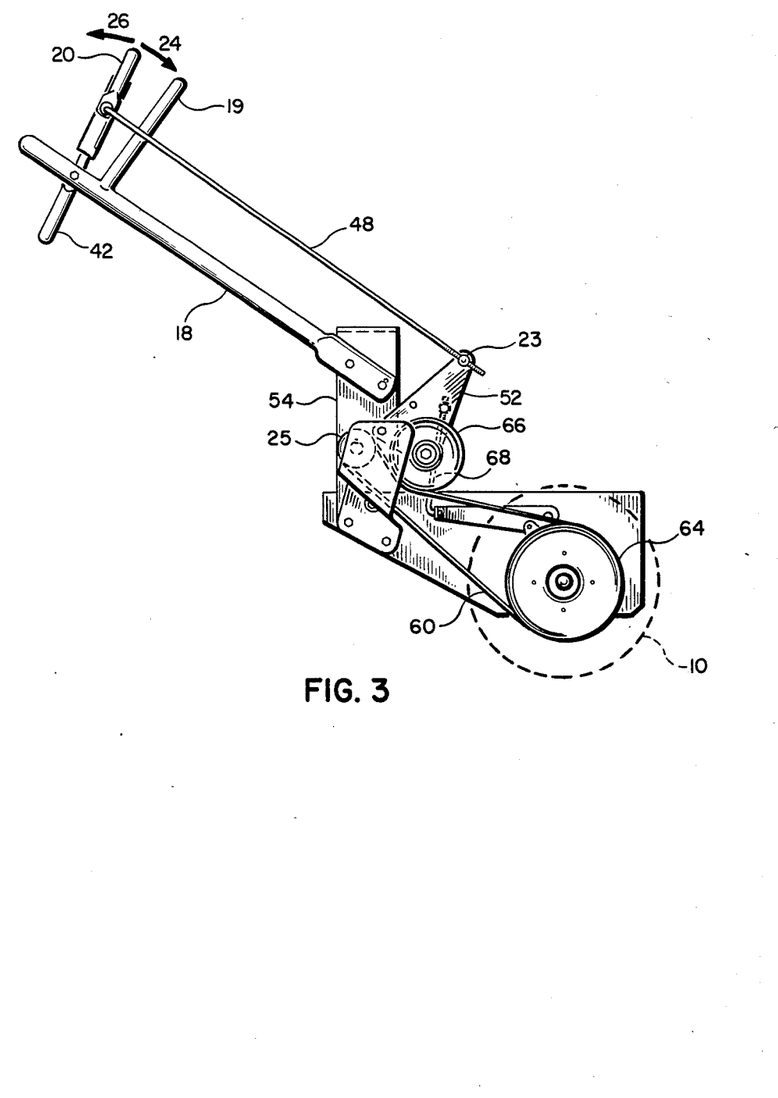
FIG. 3 is a fragmentary side view of the mower of FIG. 1, particularly showing the control linkage.
Figure 8:
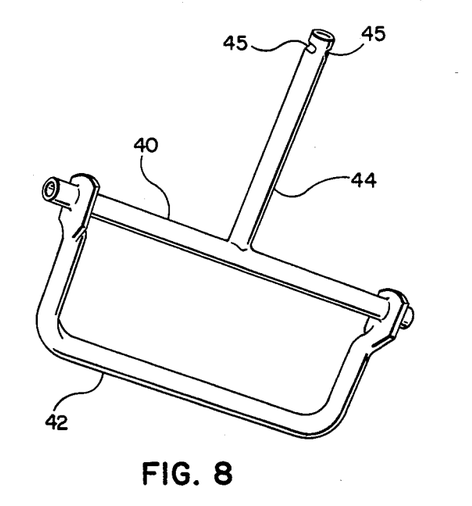
FIG. 8 is a perspective view of a portion of the control of FIG. 2 illustrating the slotted holes.

Referring now to FIG. 2, control bar 20 has a cross portion 21 with ends 22 of bar 20 bent downwardly at an angle of 90° to the cross portion of bar 21. A centrally located hollow tube is welded to bar 20 and extends perpendicularly downward in the same plane as ends 22. Shaft 40 is pivotally attached to handle 18 transverse to the direction of travel, just to the rear of hand rest 19. Shaft 40 includes reverse bar 42 to be utilized for a purpose to be described later. A central stem 44 is welded perpendicular to shaft 40 in the same plane as reverse bar 42. Stem 44 has diametrically opposed slotted holes 45 parallel to bar 42 near the upper end of stem 44. The slotted holes 45 are disposed in a plane perpendicular to the axis of stem 44. Each slotted hole 45 is optimally ⅜ inch long. Tube 38 fits down over stem 44 in a pivotal fit and includes mounting holes corresponding to holes 45 in stem 44. Tube 38 is secured to stem 44 by bolt 46 or similar means. The slotted holes 45 in stem 44 allow bar 20 to pivot in a limited arc on stem 44. Pivot shaft 40 allows bar 20 to be rotated forward and backward. In the preferred embodiment a brake lever 50 is secured to tube 38 by bolt 46 and can be folded against tube 38 when not in use. Its utility will be described later.

Figure 4:
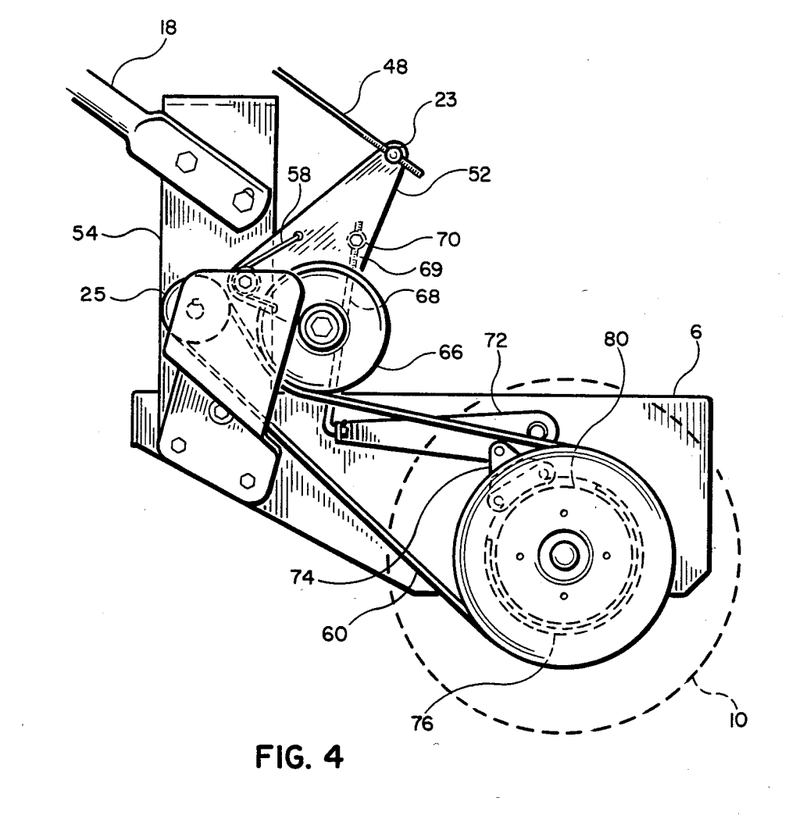
FIG. 4 is a fragmentary side view of the mower of FIG. 3, particularly showing the brake linkage.

FIG. 4 illustrates the lower end of control rod 48 where it is connected to bracket 52. Rod 48 is threaded on one end and is secured to bracket 52 on bar 20 by threaded fittings 23 so that rod length can be adjusted to equalize traction on both sides. Bracket 52 is pivotally attached to a vertical member 54 of the mower frame by means of a spacer (not shown) and bolt 56. A torsion spring 58 is installed over the spacer and is anchored against bracket 52 and frame member 54. Torsion spring 58 urges bracket 52, linkage rod 48, and bar 20 rearwardly. A double width belt 60 extends loosely between drive pulley 25 and wheel pulley 64 which is attached to drive wheel 10. A relatively large idler pulley 66 is rotatably mounted to the lower front corner of bracket 52, whereby pulley 66 is engageable with belt 60 close to drive pulley 62. The large size of idler pulley 66 and its location close to drive pulley 62 provide sufficient belt wrap around drive pulley 62 without imposing an unnecessary stress on belt fibers by excessive deflection. This minimal stress on belt 60 contributes to considerably longer belt life than has been experienced in many of the prior art machines.

Figure 5:
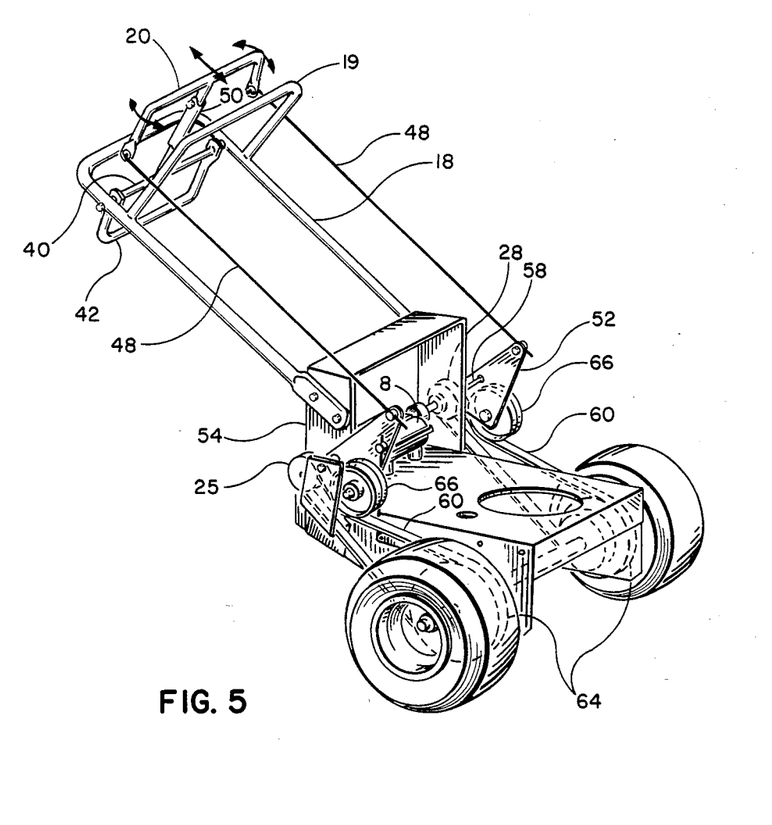
FIG. 5 is a fragmentary perspective view of the mower of FIG. 1 showing the relationship of the linkages of both sides.

A brake rod 68 threaded on one end 69 is received in a threaded fitting 70 rotatably attached to bracket 52. The threaded end 69 of rod 68 allows for adjustment to equalize brake tension on both drive wheels 10. Rod 68 extends downwardly to brake arm 72 and is secured by a hairpin cotter (not shown) or other means. Arm 72 extends forwardly toward wheel 10 and is pivotally attached to frame 6. Brake link 74 extends between arm 72 and brake band 76. Band 76 fits loosely around brake drum 80 attached to wheel pulley 64 which in turn is attached to drive wheel 10. FIG. 5 is a perspective view of the operative elements of the present invention, in which the engine, housing, and other components that form no part of present invention are omitted for clarity.

To operate the mower, an operator at the operator's station behind the handles 18 will place shift lever 28 in netural and start engine 4. He will then place the shift lever 28 in the desired gear ratio and adjust throttle 29 to attain the desired engine speed. Gears in transmission 8 are rotated by a belt from engine 4 and transmission shafts are rotating drive pulleys 25. However, drive pulleys 25 are rotating freely inside the belt, which is still loose around pulleys 25 and 64. Bar 20 is pushed evenly forward to initiate forward motion. Bar 20 rotates horizontally about shaft 40. This movement is conveyed by rods 48 to bracket 52. Bracket 52 pivots forward and downwardly. Idler pulley 66 mounted to bracket 52 is thus engaged with belt 60 and places a tension on belt 60 thus tightening belt 60 around drive pulley 25 and wheel pulley 26, thereby providing ground traction. When bar 20 is released, torsion springs 58 urge bracket 52, idler pulley 66, rod 48 and bar 20 back to their original positions, thus removing tension from belt 60 and thereby disengaging the ground drive. This feature provides a significant safety element, as the drive is thus "normally disengaged". Even though the transmmission may still be in gear, the mower will not move unless control bar 20 is moved forward. Prior art machines are typically "normally engaged". That is, when they are shifted into gear, the unit will move unless brake levers are engaged. If the operator falls, prior art units will keep going, whereas the mower of the present invention will stop if the handle is released.

Figure 6:
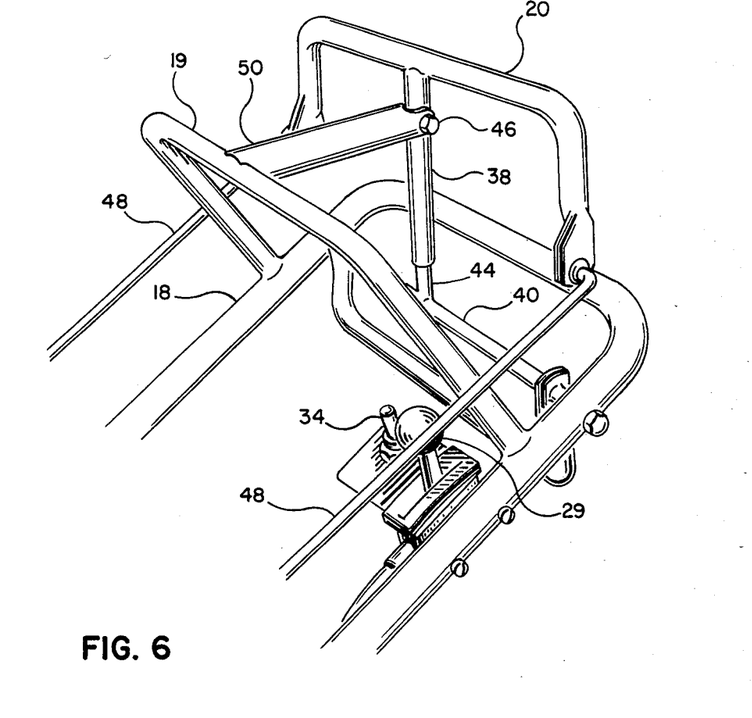
FIG. 6 is a perspective view of the control bar of FIG. 1 with the parking lever engaged.
Figure 7:
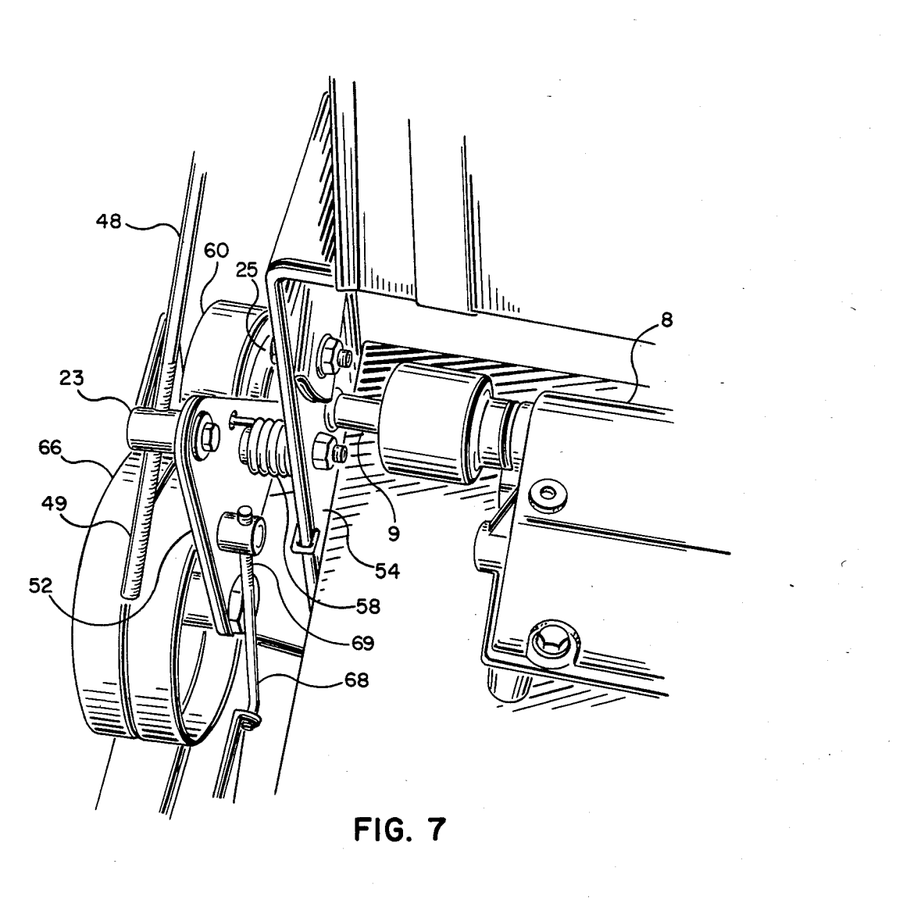
FIG. 7 is a perspective view of the mower of FIG. 5, particularly showing the torsion spring.

To make a gradual turn, the operator merely presses forward on one end 22 of bar 20. The belt 60 on the side corresponding to the selected end will engage the wheel drive on that side, while the other wheel drive remains disengaged, and the mower will turn in the direction opposite to the engaged wheel. That is, pushing forward on the right end 22 of bar 20 will cause the unit to turn to the left, and vice versa. To make a sharp turn, for example a turn of zero radius, the operator presses forward on one end 22 of bar 20 while pulling rearwardly on the other end of bar 20. The horizontally slotted mounting holes 45 allow this pivoting movement. The wheel drive on the side of forward movement of bar 20 will be engaged, while on the side of rearward movement of bar 20, the brake 76 on that side will be engaged. The unit will make a power turn, pivoting around the braked wheel. To apply the brakes to stop ground travel, the operatormerely pulls bar 20 evenly to the rear. The wheel drives will be disengaged and brake band 76 will be tightened around brake drums 80. To hold the brakes in the engaged position for parking, the operator merely swings brake lever 50 forward and upwardly from a storage position against tube 38 and wedges lever 50 against stationary hand rest 19. The free end of lever 50 has a concave conformation so lever 50 nestles over rest 19 and remains in place until the operator releases it by pulling back further on bar 20 and returning lever 50 to its storage position against tube 38.

In the preferred embodiment of the present invention, a reverse bar 42 is integrally attached to pivot shaft 40 and is disposed downwardly in the same plane as stem 44. Since stem 44 is attached to bar 20 by means of tube 38 and bolt 46, reverse bar 42 rotates with control bar 20, although in the opposite direction. Therefore, as control bar 20 is rotated forward to engage the wheel drive, reverse bar 20 rotates rearwardly. An industry standard decrees that control movement should correspond with ground movement. That is, when a control member is moved rearward, the machine should move rearward. Thus, when the transmission is shifted into reverse, the operator pulls the reverse bar 42 to the rear. This action also rotates bar 20 forwardly to engage the drive. Since the transmission is shifted into reverse gear, the machine moves rearwardly. Thus is provided an inexpensive control that complies with industry standards by using existing components.

Various modifications of the present invention may be apparent to those skilled in the art. Thus the scope of this invention is to be limited only by the appended claims.

We claim:

1. A self-propelled implement including two spaced apart drive wheels with brakes, at least one non-driving support wheel, a power source, a frame, transmission means including drive shafts and drive pulleys, a handle and a working element, the improvement comprising:
    (a) a control bar having a downwardly extending central tube perpendicular to said bar, said tube having two diametrically opposed holes adjacent said bar, said holes prallel to said bar;
    (b) a shaft transversely and pivotally mounted to said handle, said shaft having an upwardly extending central tubular stem perpendicular to said shaft, said stem sized to fit rotatably inside said tube and having two diametrically opposed holes, said holes parallel to said shaft and slotted in a plane perpendicular to the axis of said stem and corresponding to said holes in said tube, whereby said tube fits over said stem and is secured thereto by a bolt or the like, whereby said slots allow said bar to be pivoted around said stem on a mount permitted by the dimension of said slots, and whereby the securing of tube to stem enables rotation of said bar forward and backward in an arc around said pivot shaft;
    (c) means for selectively engaging one or both drive wheels for driving traction whereby the implement moves straight and the gear ratio selected when both wheels are engaged, and moves in a gradual turn when only one wheel is engaged, the turn being in the direction opposite the engaged wheel;
    (d) means attached to said drive engaging means for selectively engaging one or both of said brakes, while simultaneously disengaging tractive power to the drive wheel associated with the engaged brake, whereby engaging both brakes will bring the implement to a stop, and engaging one brake will assist in making a sharp turn, pivoting on the braked wheel; and
    (e) means for returning said control bar to its original position when said bar is released, thereby disengaging drive power to said wheels.

2. The device of claim 1 wherein said drive engaging means comprises a linkage rod between said bar and a pivotable bracket including an idler pulley, a drive belt loosely disposed over said drive pulley and a pulley attached to said wheel, whereby when said bar is pressed forward said linkage and said pivotable bracket urge said idler pulley into contact with said belt to impose a tension on said belt thereby supplying a driving force to said wheel.

3. The device of claim 2, wherein said brake engaging means comprises a brake rod between said bracket and said brake, and whereby said rod engages or disengages said brake in response to an action of said bar, said linkage and said bracket.

4. The device of claim 3, wherein said returning means comprises a torsion spring disposed between said bracket and said frame, said spring urging said bracket linkage and bar back to their original positions thereby releasing the tension on said belt and disengaging the traction drive.

5. The device of claim 4, wherein a brake lever is pivotally attached to said tube and may be removably inserted between said tube and said hand grip when said bar is pulled rearwardly to engage the brakes, whereby said brakes will be held in the engaged position thereby providing a parking brake function.

6. The device of claim 5, wherein a reverse bar is integrally attached to said pivot shaft to be activated when said transmission is shifted into reverse gear thereby providing a control in conformity with industry standards whereby when the control is moved rearwardly the machine moves rearwardly.

* * * * *